UNITED STATES PATENT OFFICE.

JOSEPH BRADFORD CLEAVER, OF BOUND BROOK, NEW JERSEY.

ANTIFRICTION COMPOSITION.

SPECIFICATION forming part of Letters Patent No. 507,970, dated October 31, 1893.

Application filed March 30, 1893. Serial No. 468,345. (Specimens.)

*To all whom it may concern:*

Be it known that I, JOSEPH BRADFORD CLEAVER, a citizen of the United States, residing at Bound Brook, in the county of Somerset, in the State of New Jersey, have invented new and useful Improvements in Antifriction Compositions, of which the following is a specification.

My invention relates to that class of compositions of matter especially adapted in the manufacture therefrom of axle-boxes and bearings for shafts or other like purposes.

My invention consists of a combination of ingredients assembled as hereinafter set forth.

The ingredients which I use in preparing my composition of matter are particles of hides or skins, either raw or tanned, a fatty substance and plumbago. The fatty substances which I can use in preparing my composition are vegetable, animal or mineral oils or fats such as linseed oil, rapeseed oil, sperm oil, tallow, petroleum and paraffine and in preparing my composition I take for instance to one pound of the particles of hides or skins, about four pounds of plumbago and about one pound of heavy petroleum and mix these ingredients intimately together so as to produce as near as possible a homogeneous mass. After the ingredients have been mixed together as above stated, the mixture is pressed into the required form.

I do not confine myself to the proportions named as I have found that all of them may be varied within certain limits and yet produce an effective material for the manufacture of a tough, hard and selflubricating axle box, washer or packing, but I have found in practice, that the best results are secured by the combination in the proportions above named.

The fiber composed of hides of animals, tanned or untanned, possesses advantages in the described composition, in that the animal fiber possesses inherent lubricating properties which materially increase the efficiency of a bearing made from the composition, and further the animal fiber is valuable in the composition, in that it absorbs the fatty substance and renders the composition durable and lasting in practical use, and perfect in lubricating qualities.

What I claim as new, and desire to secure by Letters Patent, is—

A composition of matter consisting of particles of hides or skins, either raw or tanned, a fatty substance and plumbago substantially as described.

In testimony whereof I have hereunto set my hand in the presence of two subscribing witnesses.

JOSEPH BRADFORD CLEAVER.

Witnesses:
W. HAUFF,
E. F. KASTENHUBER.